United States Patent [19]

Huang et al.

[11] 3,862,258

[45] Jan. 21, 1975

[54] ISOPARAFFIN-OLEFIN ALKYLATION WITH ADDED WATER AND WITH A COMPLEX OF A MACRORETICULAR ACID CATION EXCHANGE RESIN AND BF

[75] Inventors: Tracy J. Huang, Trenton, N.J.; Anthony J. Silvestri, Morrisville; Sergei Yurchak, Washington Crossing, both of Pa.

[73] Assignee: Mobil Oil Corporation, New York, N.Y.

[22] Filed: Nov. 29, 1973

[21] Appl. No.: 420,339

[52] U.S. Cl. .......................................... 260/683.44
[51] Int. Cl. .............................................. C07c 3/52
[58] Field of Search .............................. 260/683.44

[56] References Cited
UNITED STATES PATENTS 2,363,116  11/1944  Bruner .......................... 260/683.44
2,843,642  7/1958  Kelly ............................ 260/683.44

*Primary Examiner*—Delbert E. Gantz
*Assistant Examiner*—G. J. Crasanakis
*Attorney, Agent, or Firm*—Andrew L. Gaboriault; Raymond W. Barclay

[57] ABSTRACT

This invention relates to a process for effecting alkylation of an isoparaffin with an olefin in the presence of a small controlled amount of water or water-forming material and a catalyst comprising a macroreticular acid cation exchange resin characterized by a surface acid concentration of less than about 0.5 milliequivalents of hydrogen ion per square meter surface area and boron trifluoride, the latter being present in an amount in excess of that required to saturate said resin.

24 Claims, 5 Drawing Figures

ISOPARAFFIN-OLEFIN ALKYLATION WITH ADDED WATER AND WITH A COMPLEX OF A MACRORETICULAR ACID CATION EXCHANGE RESIN AND BF

BACKGROUND OF THE INVENTION

1. Field of the Invention

This invention pertains to a process for alkylation by reaction of an isoparaffin and an olefin.

2. Description of the Prior Art

Alkylation achieved as a result of reaction between an isoparaffin and an olefin has heretofore been recognized as resulting in an alkylate product useful as a high octane blending stock in gasoline.

Sulfuric acid and HF alkylation processes have been used for the production of such alkylate. These processes employ liquid-liquid catalytic systems which are known to be expensive and troublesome because of such problems as maintaining an acid/hydrocarbon emulsion, product separation and waste disposal.

In order to overcome such problems, attempts have been made in the past to conduct the desired alkylation in a heterogeneous catalyst system. One such attempt described in U.S. Pat. No. 3,251,902 has involved the use of crystalline aluminosilicate zeolites as catalysts. While certain of such crystalline aluminosilicate zeolites have been found to be effective catalysts for isoparaffin/olefin alkylation, they have the disadvantage of aging rapidly and requiring frequent regeneration to maintain requisite selectivity.

Another approach which has been suggested in the past is the use as a catalyst for effecting the desired isoparaffin/olefin alkylation of a complex of a microreticular or gel type ion exchange resin and boron trifluoride. The use of such complex, although suggested almost 20 years ago, see for example U.S. Pat. No. 2,843,642, has not been adopted on a commercial scale due to side formation of unwanted olefinic products and relatively low selectivity for the desired branched alkylate product.

BRIEF DESCRIPTION OF DRAWINGS

The invention is described in conjunction with the accompanying drawings in which.

SUMMARY OF THE INVENTION

Figure 1:
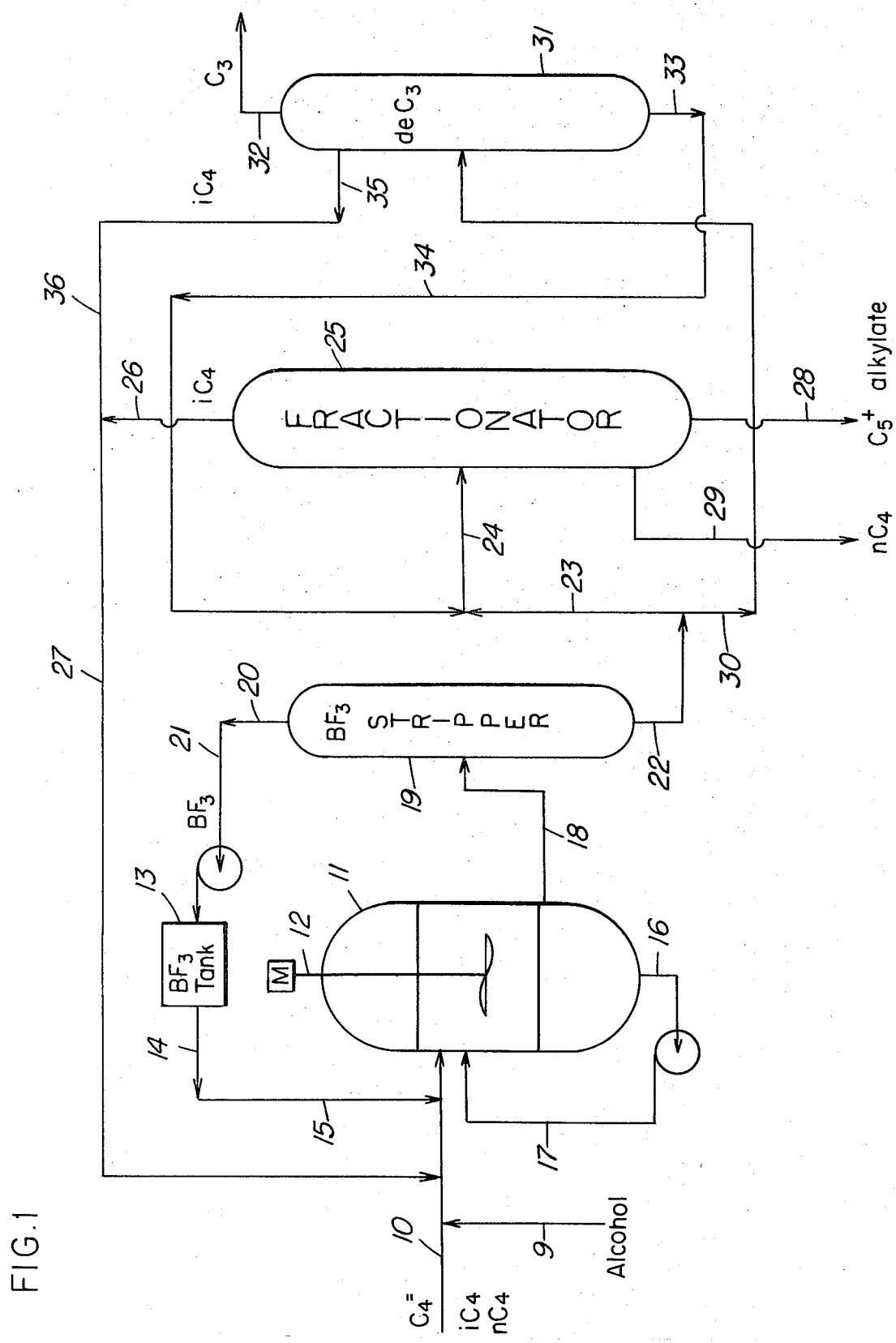
FIG. 1 illustrates a continuous mode of operation.

In accordance with the present invention, there is provided an isoparaffin/olefin alkylation process which overcomes many of the disadvantages of those previously employed and/or suggested. The method described herein, in contrast to that of U.S. Pat. No. 2,843,642, utilizes a catalyst comprising a macroreticular acid cation exchange resin and boron trifluoride. It has been found that the life of such catalyst can be extended by the presence in the reaction mixture of closely controlled amounts of water which may be added to the feed as water or as a water-forming compound such as, for example, an alcohol. The particular class of macroreticular acid cation exchange resins employed are characterized by substantial porosity, high surface area and low surface acid concentration, generally less than about 0.5 milliequivalents of hydrogen ion per square meter surface area. For effecting the desired alkylation, the cation exchange resin should contain a small amount of water, generally between 0.5 and 20 percent by weight. The use of such catalyst, as more particularly described and claimed in copending application Ser. No. 409,563, filed Oct. 25, 1973, the disclosure of which is incorporated herein by reference, has been found to unexpectedly result in an attractive yield of alkylate product of high octane number.

The macroreticular resins utilized in the process of this invention are characterized by the presence of acid functional groups and a structure having a high degree of true porosity while possessing rigidity and being subject to minimum volume change when immersed or removed from solvents or solutions.

The macroreticular acid ion exchange resin employed is typified by the presence of sulfonic acid groups, e.g. the sulfonated styrene-divinylbenzene copolymer exchange resins such as those commercially available as Amberlyst-15, Amberlyst XN-1005, Amberlyst XN-1010, Amberlyst XN-1011, Amberlyst XN-1008 and Amberlite 200. The properties of these resins, along with Amberlite IR-120H, a typical microreticular resin are shown below:

| Resin | Macroreticular | | | | | | Microreticular |
|---|---|---|---|---|---|---|---|
| | Amberlyst-15 | Amberlyst-XN-1005 | Amberlyst-XN-1010 | Amberlyst-XN-1011 | Amberlyst-XN-1008 | Amberlite-200 | Amberlite-IR-120H |
| Skeletal Structure | Styrene-DVB | do. | do. | do. | do. | do. | do. |
| Ionic Functionality | $RSO_3H$ | do. | do. | do. | do. | do. | do. |
| Hydrogen Ion Concentration meq/g dry (Exchange Capacity) | 4.9 | 3.4 | 3.3 | 4.2 | 4.5 | 4.3 | 5.0 |
| Porosity, % | 32 | 42 | 47 | 24 | — | — | 1.8 |
| Avg. Pore Diameter, A | 200-600 | 80-90 | 40-50 | — | 400-800 | — | — |
| Cross-linkage | ~20 | — | — | — | — | ~20 | 8 |
| Surface Area, $m^2/g$ dry | 40-50 | 100-120 | 550-600 | 28 | 30-40 | 40-50 | <0.1 |
| Surface Acid Concentration meq $H^+/m^2$ S.A. | 0.102 | 0.031 | 0.006 | 0.150 | 0.129 | 0.096 | >50 |

Surface acid concentration is determined by dividing the exchange capacity by the surface area in the dry state and is reported as milliequivalents of hydrogen ion per square meter surface area. The lower the surface acid concentration of the resin, the more effective is the resin/$BF_3$ catalyst for alkylation. In general, the surface acid concentration of the resin should be below about 0.5 milliequivalents of hydrogen ion per square meter surface area and preferably between about 0.001 and about 0.2 milliequivalents of hydrogen ion per square meter surface area.

The described resin and $BF_3$ form a complex. Neither $BF_3$ alone nor the resin alone is an effective catalyst for the desired isoparaffin/olefin alkylation. Likewise, the 1:1 complex (resin:$BF_3$) is also ineffective for alkylation. It has been found necessary that the amount of boron trifluoride present be in excess of that required to saturate the resin. Thus, effective macroreticular resin/$BF_3$ alkylation catalysts have been found to be generally characterized by an equivalent ratio of $BF_3$/acid groups of resin exceeding two.

The catalyst and more particularly the cation exchange resin component thereof used in accomplishing the desired alkylation is characterized by a water content of between about 0.5 and about 20 weight percent and preferably between about 1.5 and about 15 weight percent. Cation exchange resins having a water content of less than about 0.5 or greater than about 20 weight percent were not found effective in achieving alkylation. Water can be introduced into the resin by contact with the requisite quantity of liquid waater or by exposure to a moisture laden atmosphere for a time sufficient to introduce the desired water content. One suitable way of introducing requisite water to the resin is by equilibrating it with air at 100 percent relative humidity for a controlled period of time.

Alkylation using the described catalyst is carried out at a temperature below that at which tthe resin decomposes, i.e. generally below 150°C. A temperature as low as −20°C. or lower may be employed. Generally the temperature, under practical operating conditions, will be within the approximate range of −20°C. to 60°C. A particularly effective temperature range is from about −20°°C. to 20°C.

The pressure employed is sufficient to maintain the reactants in the liquid state. In general, the pressure will be between about 50 and about 1500 psig and preferably between about 100 and 500 psig.

The isoparaffin reactant used in the present alkylation process is one having from 4 to 8 carbon atoms. Representative examples of such reactant are isobutane, 3-methylhexane, 2-methylbutane, 2,3-dimethylbutane and 2,4-dimethylhexane.

The olefin reactant employed contains from 2 to 12 carbon atoms. Representative examples are butene-2, isobutylene, butene-1, propylene, ethylene, hexene, octene and heptene. Particularly preferred is a $C_4$ olefin, i.e. butene-1, butene-2 or isobutylene either alone or in admixture.

The molar ratio of isoparaffin to olefin is generally between about 2 and 50 and more particularly between about 3 and about 10. The weight ratio of resin to total hydrocarbon, that is isoparaffin, olefin and alkylate generally is between about 0.01 and about 0.5 and more particularly between about 0.04 and about 0.2.

The useful cycle life of the macroreticular acid cation exchange resin/boron trifluoride catalyst used in the isoparaffin/olefin alkylation operation can be increased by the controlled addition of water or water-forming materials to the reaction zone. The amount of introduced water either as such or in the form of an alcohol or other water-forming material is necessarily quite small, generally less than about 400 ppm based on the hydrocarbon feed. Preferably, the amount of introduced water is within the range of about 10 to about 300 ppm and more particularly in the range of 20 to 200 ppm. Suitable water-forming materials which may be introduced into the reactor, without interfering with desired alkylation include alcohols, such monohydric or dihydric alcohols, e.g. glycols, which upon dehydration, yield water. Of this group, particular preference is accorded the aliphatic alcohols, especially those containing 1 to 6 carbon atoms, typified by methanol, ethanol, isopropanol, t-butyl alcohol and isopentyl alcohol.

The alkylation operation may be carried out either as a batch, semi-batch, continuous or semi-continuous operation. The time of reaction will be governed by the nature of the isoparaffin and olefin reactants employed, the ratio of such reactants, the temperature and pressure conditions utilized and the particular macroreticular resin/$BF_3$ catalyst used.

The reactants and the catalyst may be contacted in various ways. Thus, the isoparaffin and olefin reactants may be charged to the reactor as separate streams or they may be premixed before charging to the reactor. The small amount of water or water-forming material is suitably introduced into the reactor along with one or both of the hydrocarbon reactants. The catalyst likewise may be first mixed with the isoparaffin or olefin before introduction into the reactor. Desirably, however, preliminary contact between the catalyst and olefin reactant should be minimized to avoid olefin polymerization. The $BF_3$ component of the catalyst may be premixed with the isoparaffin reactant which is then introduced into the reactor with subsequent addition of the olefin reactant. The $BF_3$ may further be introduced into the reaction zone separately from the introduction of the isoparaffin and olefin reactants. The catalyst may be formed in situ by prior introduction of the macroreticular resin into the reactor followed by addition of $BF_3$.

As aforenoted, the desired alkylation may be carried out as a batch or semi-batch type operation. In the case of a batch operation, the isoparaffin and olefin reactants, together with the small amount of water or water-forming material, are charged to a closed reactor containing the catalyst, which is thereafter maintained at the desired temperature for the desired time. At the conclusion of the reaction, the hydrocarbon product mixture is withdrawn from the reactor and the alkylate product separated from unreacted materials and side products.

The alkylation process of this invention can also be carried out in continuous fashion, in which instance streams of the isoparaffin containing less than 200 ppm of water or water equivalent of an alcohol or other water-producing material, the olefins and boron trifluoride are continuously charged to a reactor containing the macroreticular resin. The reactor is desirably stirred and maintained at the reaction temperature. The reaction mixture product is continuously withdrawn from the reactor, conducted to a vessel wherein $BF_3$ is removed as overhead and recycled to the reactor. The remaining product is conducted to a fractionator in which unreacted isoparaffin is removed as overhead and recycled to the reactor. The desired $C_5^+$ alkylate product is withdrawn as bottoms from the fractionator. This product boils in the pentane range and below the maximum temperature usable in gasoline. Generally, the gasoline end point is about 400°F. The alkylate product is usually characterized by a boiling range between that of isopentane and 400°F. A portion of the stream coming off the vessel from which $BF_3$ is removed is conducted to a depropanizer, in which $C_3$ components are removed as overhead and heavier components, removed as bottoms, are recycled to the fractionator. Also, the isoparaffin reactant is suitably removed as a separate stream from the depropanizer and recycled to the reactor.

A suitable system for carrying out the continuous process is shown in FIG. 1. As will be realized, this described embodiment is schematic in that several items of processing equipment have been omitted for purposes of simplification. Turning to FIG. 1, an alcohol or alternatively an isobutane-alcohol solution of desired concentration was fed through line 9 to a stream containing isobutane, butenes along with some normal butane introduced through line 10 to reactor 11 provided with a stirrer 12. The macroreticular resin has previously been introduced into the reactor. $BF_3$ is introduced from tank 13 through lines 14 and 15 into the reactor. The amount of $BF_3$ introduced is such as to exceed that necessary to saturate the resin. Catalyst slurry is removed from the reactor through outlet 16 and recycled via line 17 to the reactor. The hydrocarbon product mixture is removed from the reactor through line 18 and introduced into $BF_3$ stripper 19, from which $BF_3$ is removed as overhead through line 20 and recycled through line 21 to $BF_3$ tank 13. The remaining hydrocarbon product mixture is withdrawn from the $BF_3$ stripper through line 22. A portion of such hydrocarbon product mixture is introduced via lines 23 and 24 to fractionator 25. Unreacted isobutane is removed as overhead through line 26 and recycled through line 27 to the reactant feed stream line 10. Desired $C_5^+$ alkylate product is withdrawn from the bottom of fractionator 25 through line 28. Any normal butane may be withdrawn from the fractionator through line 29. The remaining portion of the hydrocarbon product mixture passing through line 22 from $BF_3$ stripper 19 is conducted through line 30 to depropanizer 31, from which propane is removed as overhead through line 32. Heavier components are removed as bottoms through line 33 and recycled via lines 34 and 24 to fractionator 25. Isobutane is removed from depropanizer 31 through line 35 and recycled through lines 36 and 27 to the initial reactant feed line 10.

DESCRIPTION OF SPECIFIC EMBODIMENTS

Results showing the importance of the resin water content to the ability of a macroreticular acid cation exchange resin/boron trifluoride catalyst to effect an isobutane/butene-2 alkylation are set forth in Table I below:

TABLE I

| Example | 1 | 2 | 3 |
|---|---|---|---|
| Water Content of Resin, wt. % | Anhydrous (0%) | 6.7 | 25 |
| Olefin Space Velocity, g$C_4^=$/g resin-hour | 2.4 | 2.6 | 2.1 |
| Olefin Conversion, % | 99 | 100 | 2 |
| $C_5^+$ Yield, g $C_5^+$/g $C_4^=$ | 0.5 | 1.96 | <0.1 |
| Trimethylpentanes in $C_5^+$, wt. % | 42 | 91.4 | — |
| $C_9^+$ in Alkylate, mole % | 60 | 7.6 | — |

The above-tabulated experiments were carried out at a temperature of 0°C. in a semi-batch reactor in which Amberlyst XN-1010, isobutane and boron trifluoride were initially placed and to which butene-2 was subsequently added continuously for 1 hour. The results of Example 1 show that anhydrous (azeotropically dried with normal heptane) Amberlyst XN-1010/$BF_3$ does not effectively catalyze the desired alkylation, as evidenced by the low yield of 0.5 gram $C_5^+$/gram of $C_4$ olefin converted (theoretical yield = 2.03 gram $C_5^+$/gram of $C_4$ olefin converted) and the large quantity of $C_9^+$ material in the alkylate. The results of Example 2 show that if the resin contains about 7 weight percent water, Amberlyst XN-1010/$BF_3$ is an effective alkylation catalyst producing an alkylate which contains 91.4 weight percent trimethylpentanes with an alkylate yield of 1.96 gram $C_5^+$/gram $C_4$ olefin. The results of Example 3 show that too much water in the resin can detrimentally affect the performance of an Amberlyst XN-1010/$BF_3$ catalyst, the resin component of which contained 25 weight percent water. Only 2 percent conversion of the olefin was achieved under essentially identical conditions. These data show that there is an optimum water content of the resin in the approximate range of 0.5 to 20 weight percent, which must be maintained in order that the acidic cation exchange resin/boron trifluoride catalyst is capable of performing with peak activity and selectivity.

During continuous alkylation of the isoparaffin/olefin feed with a macroreticular acid cation exchange resin/boron trifluoride catalyst, the product yield and selectivity declined with use. This decline is considered to be associated, in part, with removal of water from the resin. A method of counteracting this activity decline by maintaining a small controlled amount of water, less than about 400 ppm, as a result of introduction of water or a water-forming material into the reaction zone has, in accordance with the present invention, been found, as will be evident from the experimental data hereinafter set forth.

All experiments were performed in a continuous stirred tank reactor. For runs without the addition of water or a water-forming material, isobutane, olefin and boron trifluoride were charged continuously to the stirred reactor, to which the macroreticular acid cation exchange resin had been added. Alkylate, unreacted isobutane, olefin and boron trifluoride were continuously withdrawn from the reactor. For runs with addition of a controlled quantity of water as a result of dehydration of an alcohol, an isobutane/alcohol solution of desired concentration was fed at the desired rate into the isobutane/olefin feed line for the duration of the run. Other input/output streams to and from the reactor were conducted as described above. All runs were made at 0°C., olefin WHSV of 2.5 grams olefin/gram resin/hour with a 5/1 isobutane/butene-2 feed. The macroreticular cation exchange resin Amberlyst XN-1010 was used in the acid form and contained about 6 weight percent water.

Figure 2:
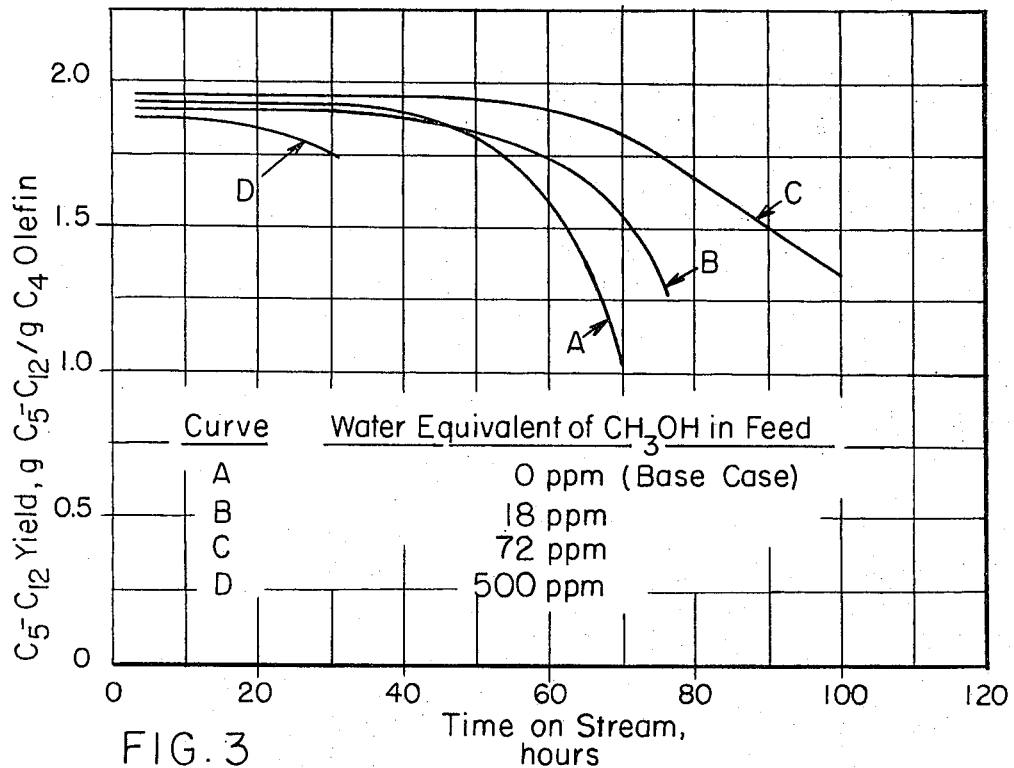
FIG. 2 depicts the relationship between yield of alkylate and time on stream in the presence of varying amounts of water equivalent.

The effect of the addition of a small amount of alcohol, e.g. methanol, to the above reaction mixture of isobutane and butene-2 in the presence of Amberlyst XN-1010/$BF_3$ catalyst at 0°C. is shown in FIG. 2 wherein alkylate yield is plotted against time on stream. Curve A shows the performance of the catalyst when the feed contains no added water. With the addition of 18 ppm of water equivalent in the feed, the performance of the catalyst, as shown by Curve B, evidences substantial improvement. Upon increase in the water equivalent in the feed to 72 ppm, as illustrated by Curve C, still further improvement in catalyst stability was observed. The fact that large quantities of water equivalent in the feed can have a detrimental effect on catalyst performance is evidenced by Curve D wherein the feed contained 500 ppm of water equivalent.

Figure 3:
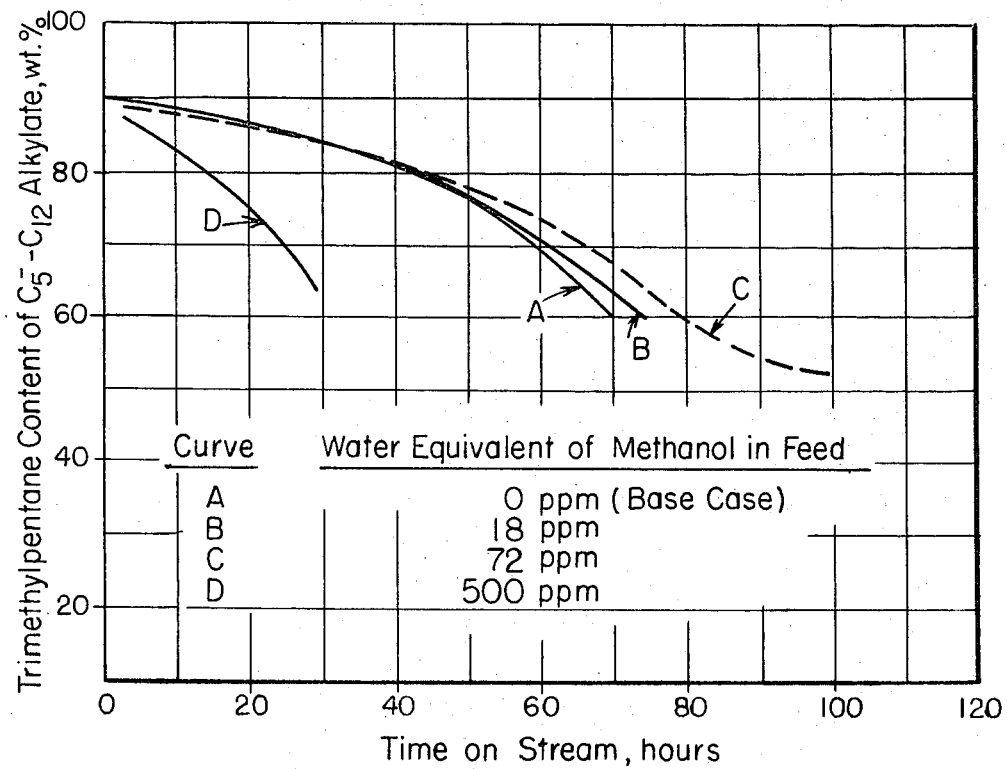
FIG. 3 depicts the relationship between quality of alkylate and time on stream in the presence of varying amounts of water equivalent.

The benefits of adding water (via methanol) to the feed in terms of product quality is shown by FIG. 3. Product quality is determined by the trimethylpentane content of the $C_5$—$C_{12}$ alkylate. The addition of small quantities, i.e. less than 72 ppm, of water equivalent to the feed resulted in improved product quality, particularly at long times on stream. The detrimental effect on product quality of large quantities of water equivalent is clearly shown by Curve D.

Figure 4:
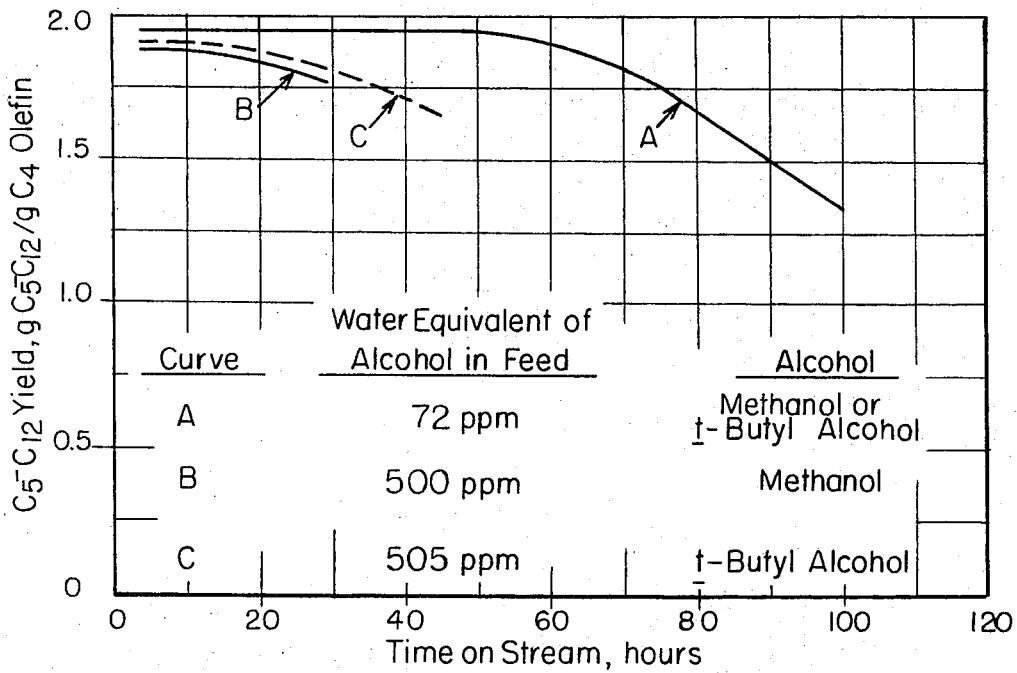
FIG. 4 depicts relationship between yield of alkylate and time on stream in the presence of small amounts of water introduced from different alcohols.
Figure 5:
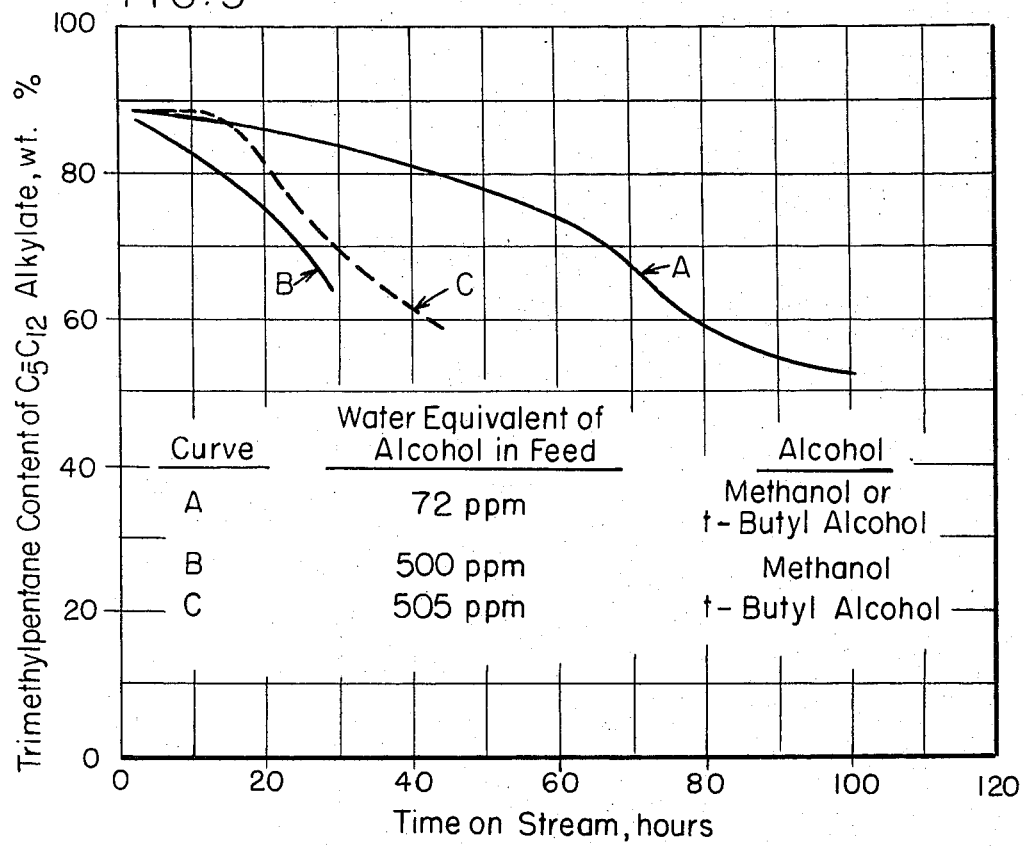
FIG. 5 depicts relationship between quality of alkylate and time on stream in the presence of small amounts of water introduced from different alcohols.

The results shown graphically in FIGS. 4 and 5 compare the effectiveness of water derived from methanol with that from t-butyl alcohol in terms of $C_5$—$C_{12}$ yield and product quality respectively. At a water equivalent level of 72 ppm, Curve A shows that the source alcohol has no significant effect on catalyst performance. At a water equivalent level of 500 ppm, water derived from t-butyl alcohol shown by the results of Curve C appears to be slightly more effective than the corresponding results achieved with methanol as shown by Curve B in terms of both product yield (FIG. 4) and product quality (FIG. 5).

From the above results, it will be seen that the addition of methanol or t-butyl alcohol to give a water equivalent of 72 ppm water, based on hydrocarbon feed, to the reaction zone during continuous alkylation of isobutane/butene-2 feed using Amberlyst XN-1010/$BF_3$ catalyst increased the catalyst's cycle life from 63 hours to 90 hours, at which point the $C_5$—$C_{12}$ yield in both cases was 1.5 grams $C_5$—$C_{12}$ alkylate/gram butene-2 converted. At equal times on stream of 70 hours, alkylation with 72 ppm water equivalent of methanol fed continuously to the reaction zone, proceeded to give a $C_5$—$C_{12}$ alkylate which contained 67 weight percent trimethylpentanes with a $C_5$—$C_{12}$ yield of 1.82 grams $C_5$—$C_{12}$/gram butene-2 converted, whereas without addition of water or its precursor, the corresponding quantities were 60 weight percent and 1.1 gram $C_5$—$C_{12}$/gram butene-2 converted.

The following example serves to show the beneficial effect achieved by water injection:

EXAMPLE 4

Amberlyst XN-1010 ion exchange resin/boron trifluoride catalyst was aged by continuously alkylating a 2/1 isobutane/butene-2 feed at 0°C. and butene-2 WHSV of 2.5 gram olefin/gram resin/hour for 30 hours at which point the $C_5$—$C_{12}$ yield declined from 1.85 to 1.35 gram $C_5$—$C_{12}$/gram butene-2 converted and the trimethylpentane content of the $C_5$—$C_{12}$ alkylate declined from 81 to 51 weight percent.

The liquid and gaseous contents of the reactor were drained and isobutane and boron trifluoride were then charged to the reactor. As soon as the reactor attained a temperature of 0°C., 0.067 g water/g resin was injected directly into the reactor all at once and 2/1 isobutane/butene-2 feed and boron trifluoride were fed continuously to the reactor as above. After 17 hours on stream, the $C_5$—$C_{12}$ yield declined from 1.71 to 1.66 gram $C_5$—$C_{12}$/gram butene-2 converted and the trimethylpentane content of the $C_5$—$C_{12}$ alkylate decreased from 67 to 53 weight percent.

It is to be understood that the foregoing description is merely illustrative of preferred embodiments of the invention of which many variations may be made by those skilled in the art within the scope of the following claims without departing from the spirit thereof.

We claim:

1. The process for alkylating an isoparaffin having from 4 to 8 carbon atoms with an olefin containing from 2 to 12 carbon atoms by contacting said isoparaffin and said olefin in the liquid state with a catalyst complex in an alkylation reaction zone maintained at a temperature between about −20°C. and about 150°C. in the presence of a small amount, less than 400 ppm of added water based on said isoparaffin and said olefin to increase the cycle life of said catalyst complex, said catalyst complex comprising a macroreticular acid cation exchange resin and boron trifluoride, said resin being characterized by a water content between about 0.5 and about 20 weight percent and a surface acid concentration of between 0.001 and about 0.5 milliequivalents of hydrogen ion per square meter surface area said boron trifluoride being present in said reaction zone in an amount in excess of that needed to saturate said resin to form said complex, the molar ratio of said isoparaffin to said olefin being between about 2 and about 50, withdrawing a hydrocarbon product mixture from said reaction zone and separating an alkylate hydrocarbon product from said mixture.

2. The process of claim 1 wherein said added water is in an amount of between about 10 and about 300 ppm.

3. The process of claim 1 wherein said added water is in an amount between 20 and about 200 ppm.

4. The process of claim 1 wherein said water is introduced into said reaction zone from a water-forming material.

5. The process of claim 4 wherein said water-forming material is an alcohol.

6. The process of claim 5 wherein said alcohol is methanol.

7. The process of claim 5 wherein said alcohol is tertiarybutyl alcohol.

8. The process of claim 1 wherein said temperature is between about −20°C. and about 60°C.

9. The process of claim 1 wherein said surface acid concentration is between 0.001 and 0.2 milliequivalents of hydrogen ion per square meter surface area.

10. The process of claim 1 wherein said resin consists essentially of a macroreticular sulfonic acid cation exchange resin.

11. The process of claim 1 wherein said olefin contains 4 carbon atoms.

12. The process of claim 1 wherein said isoparaffin is isobutane.

13. A continuous process for alkylating an isoparaffin having from 4 to 8 carbon atoms with an olefin containing from 2 to 12 carbon atoms in the presence of a small amount, less than 400 ppm of water based on said isoparoffin and said olefin and a catalyst complex comprising a macroreticular acid cation exchange resin and boron trifluoride which comprises continuously introducing streams of said isoparaffin, olefin, added water and boron trifluoride into a reactor containing said resin, said resin being characterized by a water content between about 0.5 and about 20 weight percent and a surface accid concentration of between 0.001 and about 0.5 milliequivalents of hydrogen ion per square meter surface area, the molar ratio of said isoparaffin to said olefin is between about 2 and about 50 and said boron trifluoride being introduced into said reactor in an amount in excess of that needed to saturate said resin to form said catalyst complex, said added water being introduced into said reactor to increase the cycle life of said catalyst complex, continuously stirring the resulting mixture at a sufficient rate and for a sufficient period of time at a temperature between about −20°C. and about 150°C. to effect isoparaffin/olefin alkylation, continuously withdrawing the resulting hydrocarbon mixture from said reaction zone and continuously separating an alkylate hydrocarbon product from said mixture.

14. The process of claim 13 wherein said added water is in an amount of between about 10 and about 300 ppm.

15. The process of claim 13 wherein said added water is in an amount between 20 and about 200 ppm.

16. The process of claim 13 wherein said added water is introduced into said reaction zone from a water-forming material.

17. The process of claim 16 wherein said water-forming material is an alcohol.

18. The process of claim 17 wherein said alcohol is methanol.

19. The process of claim 17 wherein said alcohol is tertiarybutyl alcohol.

20. The process of claim 13 wherein said temperature is between about −20°C. and about 60°C.

21. The process of claim 13 wherein said surface acid concentration is between 0.001 and 0.2 milliequivalents of hydrogen ion per square meter surface area.

22. The process of claim 13 wherein said resin consists essentially of a macroreticular sulfonic acid cation exchange resin.

23. The process of claim 13 wherein said olefin contains 4 carbon atoms.

24. The process of claim 13 wherein said isoparaffin is isobutane.

* * * * *